Sept. 15, 1942.  D. J. NEALE  2,295,749
MACHINE FOR ATTACHING A CABLE TO A MESSENGER
Filed June 24, 1940  3 Sheets-Sheet 1
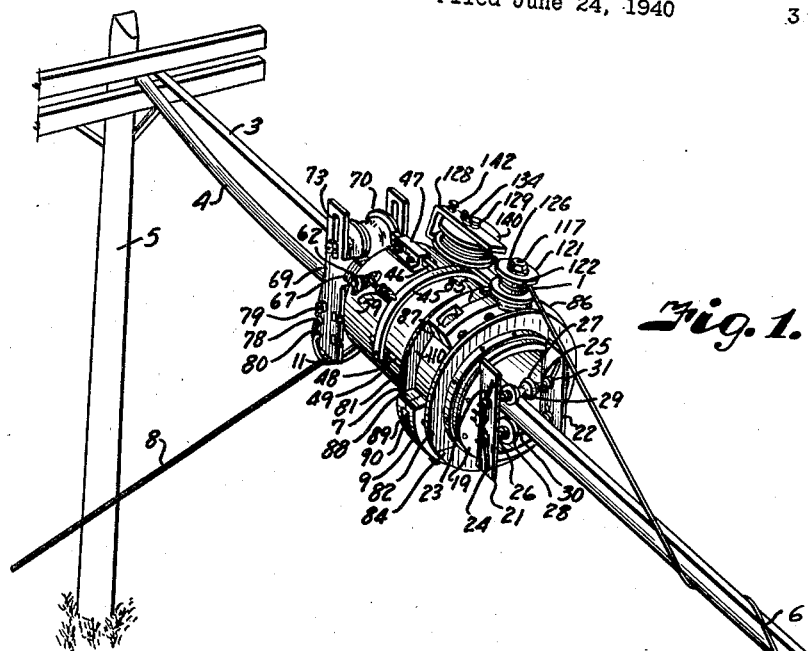
INVENTOR
Dory J. Neale.
BY Arthur Le Brown
ATTORNEY Sept. 15, 1942.  D. J. NEALE  2,295,749
MACHINE FOR ATTACHING A CABLE TO A MESSENGER
Filed June 24, 1940   3 Sheets-Sheet 2
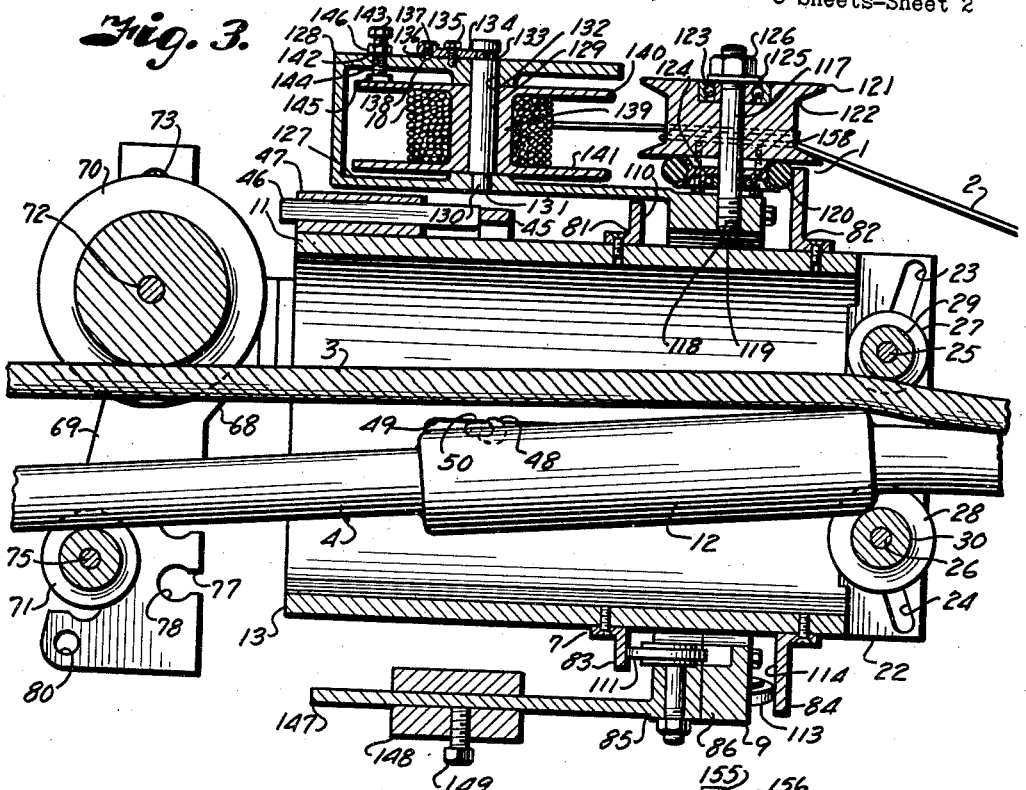
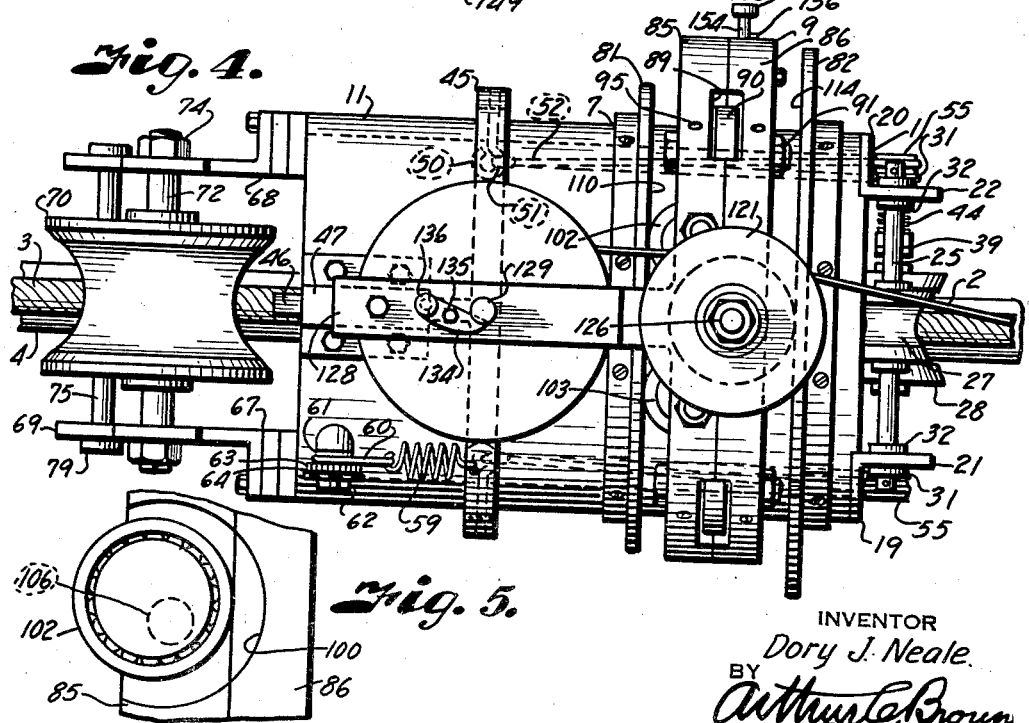
INVENTOR
Dory J. Neale.
BY Arthur C. Brown
ATTORNEY Sept. 15, 1942.  D. J. NEALE  2,295,749
MACHINE FOR ATTACHING A CABLE TO A MESSENGER
Filed June 24, 1940  3 Sheets-Sheet 3
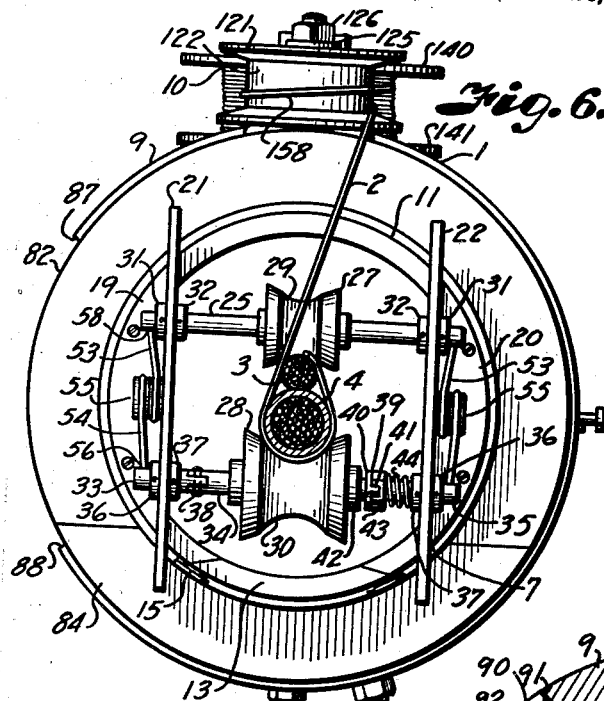
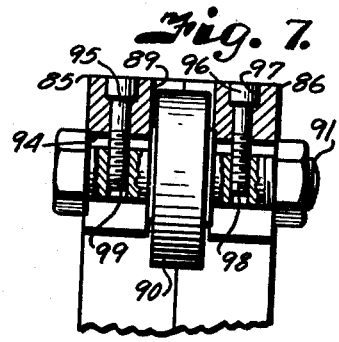
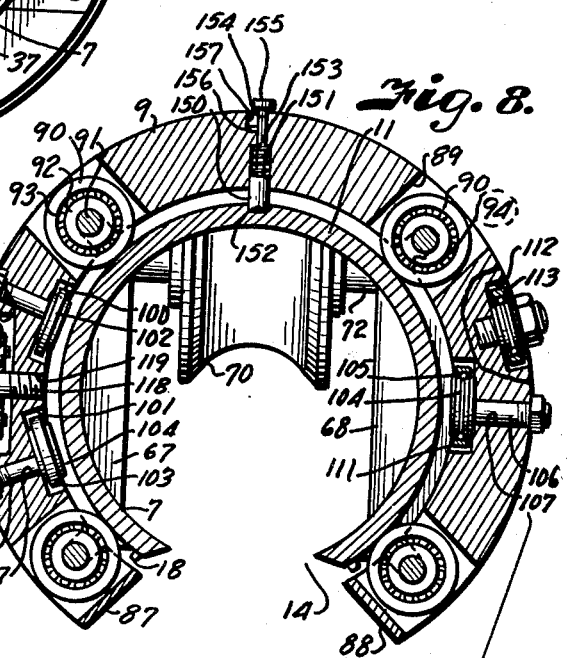
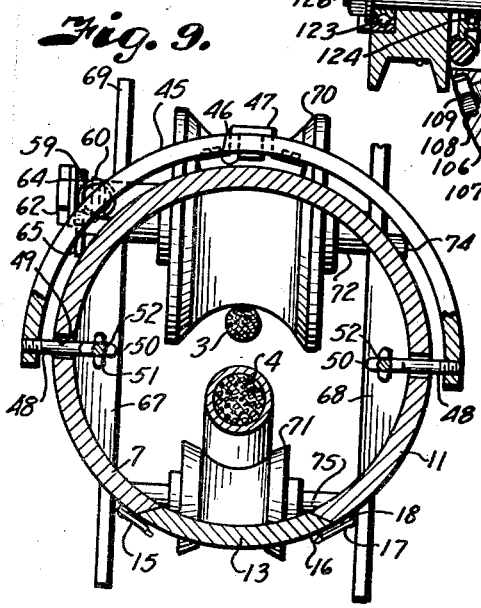
INVENTOR
Dory J. Neale.
BY
Arthur C. Brown
ATTORNEY Patented Sept. 15, 1942

2,295,749

UNITED STATES PATENT OFFICE 2,295,749

MACHINE FOR ATTACHING CABLES TO MESSENGERS

Dory J. Neale, Topeka, Kans.

Application June 24, 1940, Serial No. 342,141

12 Claims. (Cl. 175—376)

This invention relates to a machine for attaching a cable to its messenger. Heretofore cables have been suspended from messengers by hangers, but these hangers have not been satisfactory and are being supplanted by a wire or strand wound in helical form about the messenger and cable to securely bind the cable thereto.

It is, therefore, a principal object of the present invention to provide a machine of simple, light weight construction and capable of travelling along the messenger to lay the binding wire.

Other objects of the invention are to provide a machine that may be readily manipulated by a single operator and that may be readily transferred from one side of a pole to the other; to provide means for centering the machine on the messenger for better balance of the wire carrier which rotates about the supporting frame incidental to movement thereof along the cable; to provide the machine with mechanism for centering and laying the cable to the messenger; to provide the machine with automatic adjusting rollers to pass over joints in the cable; to provide the machine with spring means for laying the cable against the messenger and maintaining uniform tension of the rollers on the messenger and cable respectively; and to provide for selective variable tension on the binding wire.

In accomplishing these and other objects of the invention, as hereinafter pointed out, I have provided improved details of structure, the preferred form of which is illustrated in the accompanying drawings, wherein:

Fig. 1 is a perspective view of a machine embodying the features of the present invention and showing its use in binding a wire or strand about a cable and its supporting messenger.

Fig. 2 is an enlarged side elevational view of the machine.

Fig. 3 is a longitudinal section showing the method of laying the cable against its supporting messenger preparatory to application of the binding strand or wire.

Fig. 4 is a plan view of the machine with the carriage shown in the same relative position as it appears in Figs. 2 and 3.

Fig. 5 is a detail view of one of the eccentric rollers for maintaining the spool carrier in centered position on the body of the machine.

Fig. 6 is a cross-section through the cable and its supporting messenger showing the machine in end elevation.

Fig. 7 is a detail view showing the mounting of one of the carriage centering rollers.

Fig. 8 is a cross-section through the machine on the line 8—8 of Fig. 2 with the insert of the machine body removed to permit removal and application of the machine to a messenger and cable supported thereby.

Fig. 9 is a cross-section on the line 9—9 of Fig. 2.

Referring more in detail to the drawings:

1 designates a machine embodying the features of the present invention and adapted for laying a binding wire or strand 2 about a messenger 3 and cable 4 supported thereby, the messenger and its cable being carried on poles 5 as in customary practice. The wire 2 is attached at one end to an adjacent pole and laid in a plurality of progressively wound convolutions 6 to the next pole where the wire is preferably cut and tied relatively to the pole for maintaining the convolutions so that the cable is closely bound to the messenger and adequately supported along the entire length thereof.

In accordance with the present invention, the machine 1 includes a trolley 7 adapted to move along the messenger under the propelling influence of a rope 8. Rotatably mounted on the trolley is a carrier 9 for a spool 10 which stores the binding strand 2 and from which the strand is unwound and coiled about the cable and its messenger incidental to travel of the trolley therealong. The trolley 7 includes a sleeve-like body 11 having an inner diameter of ample size to accommodate the cable, its messenger, and any splice or coupling joint 12 over which the machine may be required to move. The sleeve is also of ample length to accommodate the necessary mechanism as later described.

In order to readily apply the trolley, the sleeve-like body 11 includes a removable longitudinal section 13 to provide a throat 14 through which the cable and its conductor are adapted to enter when the machine is placed thereover. The side edges of the section 13 are formed substantially on chords extending through the sleeve and intersecting on a diameter thereof midway of the throat 14. The edges of the removable section are thus adapted to abut against the corresponding edges at the sides of the throat 14, and are securely clamped thereagainst by pairs of toggle clasps 15 and 16, the loops 17 of which engage over lugs 18 as shown in Figs. 8 and 9. Any number of clamps may be employed, however, I find that one pair at each end of the trolley is sufficient to support the removable section, thereby facilitating removal thereof when the machine is to be transferred from one side of a pole to the other.

Fixed to the rear end of the trolley by substantially arcuate plates 19 and 20 are rearwardly extending parallel wings or flanges 21 and 22. The wings 21 and 22 each have a pair of angularly arranged slots 23 and 24 with the outer ends of the slots located adjacent the rear edges of the wings and the inner ends adjacent to the forward portion of the wings so that the slots form guides to retain axles 25 and 26 for wheels 27 and 28. The wheels 27 and 28 have grooved faces 29 and 30 adapted to respectively track on the messenger 3 and cable 4 under action of a tensioning mechanism to center the machine relatively thereto and bring the cable into contact with the messenger. The axle 25 is of sufficient length to bridge the space between the wings and carries collars 31 and 32 thereon adapted to engage the respective side faces of the wings to retain the wheel 27 in centered position. The axle 26 supporting the wheel 28 is formed of sections 33, 34 and 35. The sections 33 and 35 are movably supported in the guide slots 23 and 24 by collars 36 and 37 similarly to the collars previously described. The guide wheel 28 is carried on the section 34 which is hinged at 38 to the section 33. The opposite end of the section 26 is intercoupled with the section 35 by a clutch connector 39 including a head 40 fixed to the section 34 and having lugs 41 adapted to interengage in notches 42 of a head 43 slidably mounted on the section 35, but which is normally retained in clutching engagement with the head 40 by a spring 44 sleeved on the section 35 and having the end bearing against the slidable head 43 and its opposite end against the adjacent collar 37.

With this construction, it is obvious that by releasing the slidable head from engagement with the fixed head 40, the axle section and the roller carried thereby may be swung on the hinge 38 in the manner of a gate to permit application of the machine. It is thus obvious that the rear end of the machine is carried by the wheels 27 and 28 and that the wheels are adapted to move to and from each other to allow for variation in the diameter of the cable and its messenger, the messenger splices and cable couplings shown in Fig. 3.

The tensioning mechanism previously mentioned includes a yoke 45 fixed to a rod 46 that is slidably mounted in a guide 47 attached to the upper, forward end of the trolley as best shown in Figs. 2 and 3. The ends of the yoke overlie the sides of the trolley and carry inwardly extending studs 48 movable in longitudinal slots 49 in a sleeve-like body, which also serve as guides to position the yoke 45. The inner ends of the studs have eyes 50 for passing the bites 51 of cables 52 at the respective sides of the machine. The ends 53 and 54 of the respective cables extend rearwardly of the machine and about guide pulleys 55 journalled on the wings 21 and 22 midway of the inner ends of the slots 23 and 24. The ends 54 of the cables extend over the pulleys and connect, as at 56, with the ends of the axle sections 33 and 35 respectively, while the ends 53 extend under the pulleys and connect with the ends of the upper axle 25, as at 58.

Connected with the yoke 45 is a tension spring 59 having its opposite end connected with a cable 60 wound upon the drum 61 of an adjusting device 62. The adjusting device 62 includes a ratchet wheel 63 fixed to the drum and having teeth 64 engaged by a click 65. It is thus obvious that the spring 59 tends to move the yoke 45 forwardly with respect to the forward travel of the machine and causes the cables 52 to draw the wheels 27 and 28 toward each other whereby the cable is laid in contact with the messenger, as clearly shown in Fig. 2. The spring 59, however, is adapted to yield when the wheels 27 and 28 contact an obstruction or an enlargement as in the instance of the coupling illustrated in Fig. 3 and designated 12, to allow passage of the obstruction relative to the machine. It is obvious that by rotating the ratchet wheel 63 in an anticlockwise direction, Fig. 2, increased tension may be applied to the spring 59 and this tension may be relieved by releasing the click 65 and allowing the ratchet wheel to rotate in a clockwise direction until the desired tension has been applied to the spring 59 to obtain the desired action on the wheels 27 and 28.

Fixed to the opposite end of the sleeve-like body, at the sides thereof, are brackets 67 and 68. The brackets 67 and 68 have substantially T-shaped heads 69 arranged vertically with respect to the longitudinal axis of the sleeve to mount a messenger engaging wheel 70 and a cable supporting wheel 71. The wheel 70 operates an axle 72 having its ends projecting through slots 73 in the heads 69 of the brackets and secured in adjusted position relatively to the axial center of the sleeve-like body by clamping nuts 74, the adjustment being necessary to position the wheel 70 with respect to a messenger and cable. The wheel 71 is carried on an axle 75 having its ends removably mounted in one of a plurality of notches 76 formed in the forward edges of the T-shaped head. The notches include throat portions 77 to pass the ends of the shaft and terminate in enlarged portions 78 to seat the shaft, the ends of the shaft being provided with heads 79, to engage the outer faces of the bracket heads. Located in the heads of the brackets, below the lowermost notches, are openings 80 for attaching the pull rope 8 by which the mechanism is drawn along the messenger.

Fixed circumferentially of the rear end of the sleeve-like body is a track 81 cooperating with a forwardly spaced track 82 to rotatably mount the carrier 9 previously mentioned. The tracks 81 and 82 include sections 83 and 84 attached to the removable section 13 of the sleeve-like body, see Figs. 6 and 8.

The carrier 9 includes a pair of arcuate-shaped plates 85 and 86 having their ends 87 and 88 spaced so that they will substantially register with the sides of the throat 14 as shown in Fig. 8. The inner faces of the plates have cooperating recesses 89 to accommodate rollers 90 arranged radially about the sleeve-like body and in contact therewith to rotatably mount the carrier. The plates are secured together to retain the rollers by fastening devices, such as bolts 91, which also form supports for the inner races 92 for antifriction bearings 93 carrying the respective rollers. The bolts preferably extend through notches 94 in the inner edges of the plates so that the rollers may be shifted to and from contact with the trolley body 11 as when fitting the carrier thereon or compensating for wear. The bolts are adjusted in the notches by means of adjusting screws 95, as shown in Fig. 7, the heads 96 of which are rotatably mounted in counterbores of bores 97 through which the shanks 98 of the screws are projected into threaded engagement with threaded openings 99 in the ends of the bolts 91.

Mounted in recesses 100 and 101 in the inner faces of the carrier plates 85 and 86 are rollers 102 and 103 with their axes arranged radially with respect to the carrier. The rollers 102 and 103 are journalled on inner bearing races 104, Fig. 5, carrying antifriction bearings 105, the inner races being eccentrically mounted on pins 106 rotatably mounted in radial bores 107 of the carrier. The bores 107 are provided at the outer faces of the carrier plates with recesses 108 to accommodate clamping nuts 109 by which the inner races of the rollers are retained in adjusted position. The peripheries of the rollers project from the forward side face of the carrier to engage the face 110 of the track 81. Located at the opposite diametrical sides of the carrier is a similar roller 111, cooperating with the rollers 102 and 103.

Located in a recess 112 at a point adjacent the roller 111, but in the outer face of the carrier plates, is a roller 113 engaging with the face 114 of the track 82. Positioned midway between the rollers 102 and 103 in the outer faces of the carrier plates is a recess 115 to accommodate a wheel 116 which is rotatably mounted on a shaft 117. The shaft 117 preferably comprises a stud having a threaded end 118 engaged in a threaded socket 119 of the carrier. The wheel 116 includes a resilient tire 120 frictionally engaging the face 114 of the track 82. Fixed to the traction wheel 116 is a drive wheel 121 having a grooved periphery 122. The wheel 121 carries an antifriction bearing 123 which cooperates with an antifriction bearing 124 of the traction wheel 116.

The wheel assembly thus described is rotatably retained on the stud by a washer 125 backed by a nut 126 threaded on the projecting end of the stud. Fixed to the carrier, in alignment with the drive wheel 121 and extending forwardly of the machine, is an arm 127 terminating in a yoke-like bracket 128 between which is journalled the spool 10 previously mentioned. The spool 10 is journalled on a removable pin 129 having a reduced end 130 seated in an opening 131 of the arm 127. The opposite end of the pin extends through an opening 132 of the yoke-like bracket 128 and has an annular groove 133 engaged by a latch 134 which is mounted on a pivot 135. The latch includes a tail portion 136 carrying a spring-pressed ball 137 adapted to engage in a depression 138 of the yoke to retain the latch in engagement with the groove 133 of the pin 129 so as to avoid dislodgment thereof. The spool 10 includes a hub 139 having spaced flanges 140 and 141 for storing the wire 2. The bracket 128 carries a brake 142 in the form of a screw 143 which is threaded in an opening 144 of the bracket and carries a shoe 145 adapted to engage the outer face of the flange 140. The screw 143 is retained in adjusted position by a jam-nut 146 threaded on the shank thereof and engaging against the outer face of the yoke to control rotation of the spool and tension the wire unwound therefrom when the machine is operated.

In order to substantially balance the bracket 128, spool 10 and the grooved wheel 121, the opposite side of the carrier has an arm 147 extending forwardly of the machine to mount a weight 148. The weight 148 is removably mounted on the arm and retained from displacement by a set-screw 149. The weight 148 is preferably such that when substantially half the wire on the spool is unwound the carrier is in complete balance.

When the section 13 of the trolley is to be removed, the carrier is retained in a position so that the terminal ends thereof register with the sides of the throat 14. This is effected by a plunger 150 that is slidably mounted in a recess 151 of the carrier and moved into a socket 152 of the sleeve-like body 11 by a spring 153. The plunger is withdrawn from the socket by a rod 154 which carries a head or knob 155. To retain the plunger in retracted position against action of the spring 153, the rod 154 carries a laterally extending pin 156 movable in a recess 157 when the plunger is moved to latching position, but when the plunger is moved from engagement with the socket 152, the pin is adapted to ride on the outer surface of the carrier and hold the end of the plunger 150 from contact with the trolley.

In using an apparatus constructed and assembled as described, a spool 10 containing the wire 2 is mounted in the bracket 128. This is readily effected by unlatching the pin 129 so that it may be withdrawn to permit insertion of the spool and registering the bore of the hub 139 thereof with the pin openings. The pin 129 is then returned to position and the head thereof secured by the latch 134. The brake 142 is then adjusted to provide friction on the spool and restrict the rotation thereof. A weight 148 of suitable size is applied to the arm 147 so that it will, as near as practical, balance the weight of the mechanism at the opposite side of the carrier, including half the weight of the wire on the spool. The carrier is then shifted relatively to the sleeve-like body of the trolley so that the ends thereof register with the sides of the throat 14, whereupon the plunger 150 is released to engage in the socket 152 and retain the carrier in latched position on the trolley. The clasps 15 and 16 are then released to permit removal of the section 13. After removal of the section 13, the connector 39 is disconnected so that the wheel 28 may be moved out of position, the axle section 34 thereof swinging on the hinge 38.

The machine is then carried to the end of the section of the cable to be attached to the messenger, the operator climbing the adjacent pole and applying the trolley so that the messenger and cable may enter through the throat 14 into the axial center of the sleeve-like body 11 with the wheels 27 and 70 resting on the messenger. The section 13 is then reapplied to close the throat 14. The wheel 28 is then removed to position for supporting the cable and the axle section 34 is secured in aligning engagement by the connector 39. The spring 59 is then tensioned by manipulating the ratchet 63 so that the wheel 28 raises the cable 4 into contact with the messenger 3, as shown in Fig. 3, the action of the spring acting through the yoke 45, studs 48, and cables 52. The wheel 70 is then adjusted by loosening the nuts 74 and sliding the axle thereof in the slots 73 until the forward end of the trolley is aligned with the messenger. The axle of the wheel is then tightened in the adjusted position, after which the wheel 71 is mounted in one of the notches 76 to support the cable 4 at that end of the machine. The free end of the wire 2 is withdrawn from the spool and one wrap, as indicated at 158, is taken in the groove 122 of the drive wheel 121, Fig. 2. The end of the wire 2 is then attached in any suitable manner to the pole so that it is firmly anchored. The plunger 150 is then released from latching engagement with the socket 152.

The pull rope 8, being attached to the brackets 67 and 68, is then drawn toward the next pole in any desired manner. Forward movement of the trolley along the messenger causes the wheel 28 to lift the cable into contact with the messenger and the wire 2 to be unwound from the spool 10. Unwinding of the wire 2 from the pool causes the drive wheel 121 to rotate the traction wheel 116 and the traction thereof with the face 114 causes rotation of the carrier progressively with forward movement of the machine, with the result that the wire 2 is laid in a series of helical convolutions in binding relation with the cable and messenger. The wheels 70 and 71 are so spaced that a coupling on the cable 4 will pass freely therebetween and when the coupling engages the wheel 28, the axles supporting the wheels 27 and 28 will move outwardly in the slots of the wings 21 and 22 and permit passage of the coupling as shown in Fig. 3, the spring 59 yielding to movement of the wheels. Immediately upon passing of the coupling, the spring 59 returns the wheels 27 and 28 to their normal position so that the remaining portion of the cable 4 will be moved into contact with the messenger 3. When the machine reaches the next pole 5 the wire 2 is cut with sufficient length to continue the wrapping up to the point of the pole. In most instances, the machine is set so that the pitch of the helical winding is approximately eleven inches. Therefore the final hand winding is relatively short. The wheel 28 is then unlatched and the carrier 9 is moved to position so that the socket 152 may be engaged by the plunger 150. The removable section 13 is then disconnected, together with the wheel 71, after which the machine is lifted to the opposite side of the pole and replaced as previously described. After making approximately one turn of the free end of the severed wire about the cable, it is attached in any suitable manner to the pole. The severed end of the wire 2 on the spool 10 is then attached in like manner to the pole and the next section of the cable is attached to the messenger in the same manner as that previously described.

From the foregoing it is obvious that I have provided a machine which is readily manipulated on the messenger by a single operator and that it may be drawn along the messenger with a minimum of effort. It is also obvious that the machine is adjustable to vary tension of the wire 2 and that the wire supports the cable axially along the entire length. Since the convolutions have uniform pitch, they will not loosen and allow sagging of any portion of the cable.

What I claim and desire to secure by Letters Patent is:

1. An apparatus of the character described, including a trolley adapted to operate upon a messenger, means on the trolley for raising a cable to be supported by the mesenger into substantial contact with the messenger, a carrier rotatable on the trolley about said cable and messenger, means on the carrier for mounting a spool of wire, an annular track on the trolley substantially coaxial with the messenger, a wheel on the carrier engaging the track, means responsive to pay of the wire from the spool to rotate said wheel on the track to move the carrier about the track, and means for moving the trolley along the messenger to effect unspooling of the wire.

2. An apparatus of the character described, including a trolley adapted for running support on a messenger, means on the trolley for raising a cable to be supported by the messenger, means for moving the trolley on the messenger, spool supporting means having a spindle member extending substantially at right angles with respect to the messenger when the trolley is mounted thereon, means on the trolley having an axis of rotation parallel with the messenger for mounting the spool supporting means for bodily movement about the trolley, and means responsive to pay of wire from said spool for effecting movement of said mounting means on said axis.

3. An apparatus of the character described, including a trolley having spaced wings at one end provided with pairs of slots, axles in said slots, a wheel on one of the axles adapted to operate upon a messenger, a wheel on the other axle adapted to support a cable, yielding means on the trolley for moving the axles toward each other to raise the cable against the messenger, messenger and cable contacting wheels at the opposite end of the trolley, a carrier rotatable on the trolley, means on the carrier for mounting a spool of wire, means for rotating the carrier to move the spool of wire about the messenger and cable, and means for moving the trolley along the messenger to effect unspooling of the wire and winding of the unspooled wire about the messenger and cable.

4. An apparatus of the character described, including a trolley having a sleeve-like body provided with a removable section to mount the trolley on a messenger, wheels on said sleeve-like body for raising a cable to be supported by the messenger into substantial contact with the messenger, a carrier rotatable on the sleeve-like body, means on the carrier for mounting a spool of wire, an annular track on the trolley substantially coaxial with the messenger, a portion of said track including a movable section carried by the removable section of said body, a traction wheel on the carrier engaging the track, means responsive to pay of the wire from the spool to rotate said traction wheel to effect rotation of the carrier, and means for moving the trolley along the messenger to effect unspooling of the wire.

5. An apparatus of the character described, including a trolley adapted for running support on a messenger, means on the trolley for raising a cable to be supported by the messenger, means for moving the trolley on the messenger, spool supporting means, annular tracks spaced on the trolley, wheels on the spool supporting means engaging facing sides of said tracks, and means responsive to pay of wire from a spool carried by said supporting means for effecting movement of the spool supporting means on said tracks.

6. An apparatus of the character described, including a trolley adapted for running support on a messenger, means on the trolley for raising a cable to be supported by the messenger, means for moving the trolley on the messenger, spool supporting means, annular tracks spaced on the trolley, wheels on the spool supporting means engaging facing sides of said tracks, means responsive to pay of wire from a spool carried by said supporting means for effecting movement of the spool supporting means on said tracks, and eccentrics mounting selected wheels for adjusting spacing of the wheels with respect to said tracks.

7. An apparatus of the character described, including a trolley adapted for running support on a messenger, said trolley including a sleeve-like body, means on the trolley for raising a cable to be supported by the messenger, means for moving the trolley on the messenger, spool supporting means, annular tracks spaced on the sleeve-like body, wheels on the spool supporting means engaging facing sides of said tracks, cooperating wheels carried by the spool supporting means and engaging the periphery of the sleeve-like body, and means responsive to pay of wire from a spool carried by said supporting means for effecting movement of the spool supporting means on said tracks.

8. An apparatus of the character described, including a trolley adapted for running support on a messenger, said trolley including a sleeve-like body, means on the trolley for raising a cable to be supported by the messenger, means for moving the trolley on the messenger, spool supporting means, annular tracks spaced on the sleeve-like body, wheels on the spool supporting means engaging facing sides of said tracks, cooperating wheels carried by the spool supporting means and engaging the periphery of the sleeve-like body, means responsive to pay of wire from a spool carried by said supporting means for effecting movement of the spool supporting means on said tracks, and eccentrics mounting selected wheels for adjusting spacing of the wheels with respect to said tracks.

9. An apparatus of the character described including, a trolley adapted for running support on a messenger, means on the trolley for raising a cable to be supported by the messenger, means for moving the trolley on the messenger, an annular track on the trolley, a carrier mounted on said track for rotation about the axis of said messenger when the trolley is supported thereon, a spool supporting spindle arranged radially of said carrier for mounting a spool of wire for rotation on an axis transversely to the axis of said annular track, and means responsive to pay of wire from the spool for effecting movement of the carrier on said annular track.

10. An apparatus of the character described including, a trolley adapted for running support on a messenger, means on the trolley for raising a cable to be supported by the messenger, means for moving the trolley on the messenger, an annular track on the trolley, a carrier mounted on said track for rotation about the axis of said messenger when the trolley is supported thereon, a spool supporting spindle arranged radially of said carrier for mounting the spool of wire for rotation on an axis transversely to the axis of said annular track, means responsive to pay of wire from the spool for effecting movement of the carrier on said annular track, and means fixed to the side of the carrier opposite said spool for effecting substantial balance of the carrier on said track.

11. An apparatus of the character described including, a trolley adapted to operate upon a messenger, means on the trolley for raising a cable into contact with the messenger, a carrier rotatable on the trolley about an axis extending in the direction of movement of the trolley, means on the carrier for supporting a spool of wire with the axis of said spool arranged transversely of the carrier axis, a frictional drive connection between the carrier and trolley including a member on the carrier having frictional contact with a cooperating member on the trolley, and means responsive to forward movement of the trolley along the messenger to rotate one of said members to effect frictional rotation of the other member and rotation of the carrier for winding a strand in helical form about the cable and messenger to secure the cable to the messenger.

12. An apparatus of the character described including, a trolley adapted for running support on a messenger, means on the trolley for raising a cable to be supported by the messenger, means for moving the trolley on the messenger, an annular track on the trolley, a carrier mounted for rotation about the trolley on an axis substantially parallel with the messenger, a spool supporting spindle arranged radially of the carrier for mounting a spool of wire for rotation on an axis transversely of the axis of the carrier, a wheel on the carrier having frictional engagement with the annular track, and a drive wheel connected with said friction wheel and having a groove for receiving a bight in the wire paid from said spool for rotating the drive wheel responsive to movement of the trolley on the messenger.

DORY J. NEALE.